(12) United States Patent
Weinshenker et al.

(10) Patent No.: US 11,463,044 B2
(45) Date of Patent: Oct. 4, 2022

(54) CORNER CONNECTOR FOR PHOTOVOLTAIC MODULE FRAME

(71) Applicant: SunPower Corporation, San Jose, CA (US)

(72) Inventors: Beryl Weinshenker, Portland, OR (US); Nathan Stoddard, Beaverton, OR (US); Steve Sefchick, Portland, OR (US); Eric Olson, Vancouver, WA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 16/278,184

(22) Filed: Feb. 18, 2019

(65) Prior Publication Data

US 2019/0181801 A1 Jun. 13, 2019

Related U.S. Application Data

(62) Division of application No. 14/935,756, filed on Nov. 9, 2015, now abandoned.

(51) Int. Cl.
*H02S 40/36* (2014.01)
*H02S 30/10* (2014.01)
*H02S 40/32* (2014.01)
*H02S 40/34* (2014.01)
(Continued)

(52) U.S. Cl.
CPC .............. *H02S 40/36* (2014.12); *F24S 25/20* (2018.05); *H02S 30/10* (2014.12); *H02S 40/32* (2014.12); *H02S 40/34* (2014.12); *F24S 2025/6007* (2018.05); *Y02B 10/20* (2013.01); *Y02E 10/47* (2013.01)

(58) Field of Classification Search
CPC ... H02S 40/30–36; H02S 30/10; F24J 2/5262; F24S 2012/6007; F24S 2012/6004
See application file for complete search history.

(56) References Cited

U.S. PATENT DOCUMENTS 4,718,185 A * 1/1988 Conlin ................... G09F 13/00
136/251
4,838,951 A 6/1989 Riermeier et al.
7,012,188 B2 3/2006 Erling
(Continued)

FOREIGN PATENT DOCUMENTS

CN 102610681 B 3/2014
CN 104333313 A 2/2015
(Continued)

*Primary Examiner* — Eric R Smith
(74) *Attorney, Agent, or Firm* — Xsensus LLP

(57) ABSTRACT

Corner connection members for a photovoltaic module frame include thru-passages for receiving insert components that perform and facilitate a variety of functions, such as attaching the photovoltaic module to a roof, providing a ground connection for the solar cells, to facilitate the mechanical and electrical connection of photovoltaic modules which are arranged side-by-side, to facilitate securing photovoltaic modules in a stack, and providing mechanical and electrical connections to adjacent photovoltaic modules in an array. Insert components may also include electronic devices, such as microinverters and energy storage devices, which are connected to the photovoltaic modules when the insert component is installed in the corner member.

20 Claims, 4 Drawing Sheets

(51) Int. Cl.
*F24S 25/20* (2018.01)
*F24S 25/60* (2018.01)

(56) References Cited

U.S. PATENT DOCUMENTS

| | | | |
|---|---|---|---|
| 7,487,771 | B1 | 2/2009 | Eiffert et al. |
| 8,875,394 | B2 | 11/2014 | Li et al. |
| D823,786 | S | 7/2018 | Stephan et al. |
| 10,024,580 | B2 | 7/2018 | Stephan et al. |
| 2002/0078991 | A1 | 6/2002 | Nagao et al. |
| 2006/0005875 | A1 | 1/2006 | Haberlein |
| 2006/0243318 | A1* | 11/2006 | Feldmeier ............... H02S 40/34 136/244 |
| 2008/0194154 | A1 | 8/2008 | Minnick |
| 2008/0257402 | A1* | 10/2008 | Kamp ..................... H02S 30/10 136/251 |
| 2010/0000605 | A1 | 1/2010 | Comert et al. |
| 2010/0243023 | A1 | 9/2010 | Patton et al. |
| 2010/0243034 | A1 | 9/2010 | Hu et al. |
| 2011/0259404 | A1 | 10/2011 | Jang |
| 2012/0222726 | A1* | 9/2012 | Qin ................... H01L 31/02008 136/251 |
| 2012/0227783 | A1* | 9/2012 | Funk ........................ H02G 3/16 136/244 |
| 2013/0074909 | A1* | 3/2013 | Sheng .................... H02S 30/10 136/251 |
| 2013/0140416 | A1 | 6/2013 | West et al. |
| 2013/0175231 | A1 | 7/2013 | Klinga et al. |
| 2013/0320771 | A1 | 12/2013 | Adest |
| 2014/0102997 | A1 | 4/2014 | West et al. |
| 2014/0339179 | A1 | 11/2014 | West et al. |
| 2015/0204583 | A1 | 7/2015 | Stephan et al. |
| 2016/0087578 | A1 | 3/2016 | Cinnamon et al. |
| 2016/0285405 | A1 | 9/2016 | Stephan et al. |

FOREIGN PATENT DOCUMENTS

| | | | |
|---|---|---|---|
| DE | 102006061284 A1 | 6/2008 | |
| DE | 102011122339 A1 | 6/2013 | |
| EP | 2234173 A2 | 9/2010 | |
| EP | 2346089 A1 * | 7/2011 | ............. F24S 25/20 |
| EP | 2808905 A1 | 12/2014 | |
| WO | 2010/019749 A3 | 12/2010 | |
| WO | 2017/067303 A1 | 4/2017 | |

* cited by examiner

CORNER CONNECTOR FOR PHOTOVOLTAIC MODULE FRAME

CROSS-REFERENCE TO RELATED APPLICATION

The present application is a divisional of U.S. patent application Ser. No. 14/935,756, filed on Nov. 9, 2015, the entire contents of which are incorporated herein by reference.

TECHNICAL FIELD

The present disclosure relates generally to photovoltaic (PV) modules (conventional or frame-less), and, in particular, to corner connection members for PV modules.

BACKGROUND

Photovoltaic module (sometimes referred to as a PV module, solar panel, solar module, or photovoltaic panel) refers to a packaged, interconnected assembly that includes a PV panel and a frame. PV panels typically have a laminate configuration with a photoelectrically active layer sandwiched between a front substrate and a rear substrate, which typically comprise glass. Frames are commonly used to provide structural rigidity and protection for the panels. Frames typically comprise a plurality of longitudinal members, e.g., bars or beams, that are connected together to form a structure that generally corresponds to the peripheral shape of the solar cell assembly. The frame members are typically attached to each other by corner connectors, often referred to as corner keys.

When framed PV modules are installed at locations, the frames of the modules are typically attached to a support structure. The attachment of PV module frames to the support structure and to each other often requires the use of many additional parts and can require a substantial amount of labor. In addition, additional wiring is often required for electrical connections to external electrical systems and to ground via the support structure. In addition, assembled PV modules can be difficult to safely store and transport due to the risk of damaging the PV panels. Innovations that can reduce the amount of parts and labor required to install PV modules and that facilitate the safe storage and transport of PV modules would be beneficial.

SUMMARY

In one embodiment, a photovoltaic module includes a planar solar collection assembly defining a planar front side surface and a planar backside surface. Four frame members are arranged to form a rectangular frame onto which the solar collection assembly is mounted. The rectangular frame has four corners. Each of the four corners is defined by a pair of the frame members. Four corner members connect the frame members to each other at each of the four corners of the frame. At least one of the corner members includes a through-hole that extends through the at least one corner member perpendicularly with respect to the planar front side and backside surfaces.

In another embodiment, a stack of photovoltaic modules includes a plurality of photovoltaic modules, each of the photovoltaic modules including a planar solar collection assembly defining a planar front side surface and a planar backside surface. Four frame members are arranged to form a rectangular frame onto which the solar collection assembly is mounted. The rectangular frame has four corners, each of the four corners being defined by a pair of the frame members. Four corner members connect the frame members to each other at each of the four corners of the frame. At least one of the corner members of each of the photovoltaic modules is configured as a connection member having a through-hole that extends through the connection member perpendicularly with respect to the planar front side and backside surfaces. The photovoltaic modules are stacked on top of one another such that the connection members having the through-holes are arranged on top of each other with the through-holes aligned to form a continuous passage that extends through the stack. A connecting rod, or threaded rod, that is sized and shaped complementarily with respect to the continuous passage is configured to be extended through the continuous passage to connect and retain the photovoltaic modules in a stacked configuration.

In yet another embodiment, an array of photovoltaic modules includes a plurality of photovoltaic modules, each of the photovoltaic modules including a planar solar collection assembly defining a planar front side surface and a planar backside surface, and four frame members arranged to form a rectangular frame onto which the solar collection assembly is mounted, the rectangular frame having four corners, each of the four corners being defined by a pair of the frame members. Four corner members connect the frame members to each other at each of the four corners of the frame. At least one of the corner members of each of the photovoltaic modules is configured as a connection member having a through-hole that extends through the connection member perpendicularly with respect to the planar front side and backside surfaces. The photovoltaic modules are arranged in an arrayed configuration, and the connection members of each of the photovoltaic modules are configured to be secured to the connection members of adjacent photovoltaic modules to retain the photovoltaic modules in the arrayed configuration.

DRAWINGS

DESCRIPTION

Figure 1:
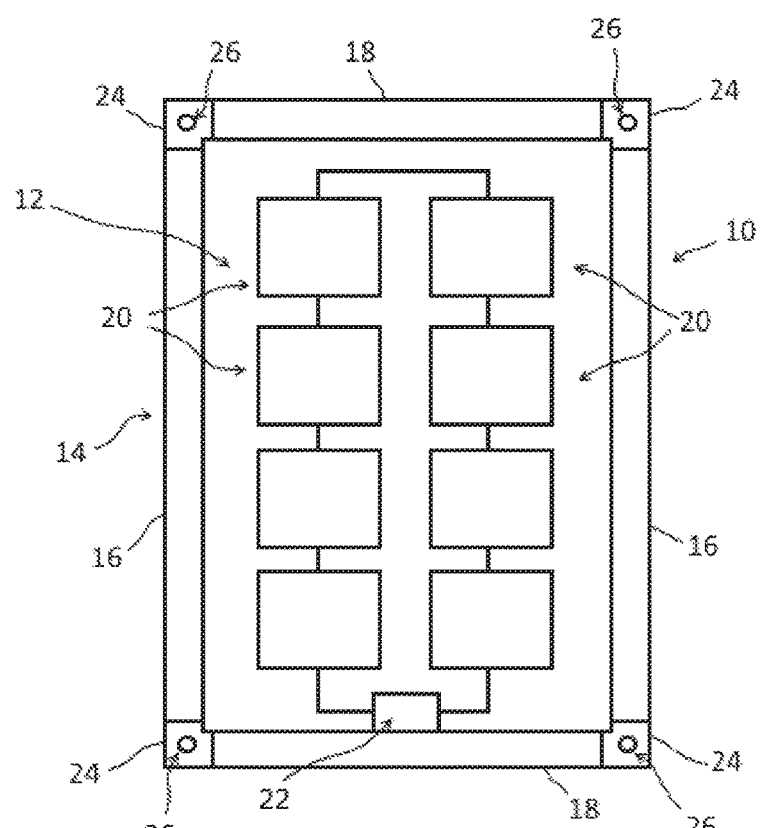
FIG. 1 is a schematic depiction of a photovoltaic module in accordance with the present disclosing having a frame including corner members having thru-passages.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

The corner connection members for the PV frame described herein have thru-passages that enable the use of simple inserts to be easily and quickly installed into the passages of the corner members to perform and facilitate a variety of functions. As discussed below, the passages through the corner members may be configured to receive longitudinal inserts which can be extended through the corner members to attach or anchor the PV module to a mounting surface, such as a roof of a building. An elongated inserts can be used to raise or elevate PV modules from a mounting surface to allow air circulation for cooling of solar cells and thereby improve efficiency and/or reliability of solar cells. Such inserts may be also be configured to provide a ground connection for the solar cells. Corner members and inserts can be configured to facilitate the connection of PV modules which are arranged side-by-side, e.g., in an arrayed configuration. Corner members and corresponding inserts may be configured to connect adjacent PV modules mechanically, electrically, or both mechanically and electrically. In addition, the configuration of the corner members enables a plurality of PV modules to be easily retained in a stacked configuration.

FIG. 1 depicts an embodiment of PV module 10 having corner connection members 24 in accordance with the present disclosure. As depicted, the PV module 10 includes a solar collection assembly 12, referred to herein as a PV panel 12 attached to a frame 14. The PV panel 12 includes a planar top surface and bottom surfaces which are surrounded by edges (not labeled). In the exemplary embodiment, the edges of the PV panel 12 define a rectangular shape although, in other embodiments, the PV panel 12 may have any suitable shape including, for example, square, pentagonal, hexagonal, and the like. The PV panel 12 may have a laminate structure comprising a photoelectrically active layer sandwiched between a front side layer (typically glass) and a back side layer or layers. The active layer is formed by at least one solar cell 20. The solar cells 20 may be formed of any one of a crystalline silicon, amorphous silicon, cadmium telluride, chalcopyrite or other suitable material. The solar cells may be embedded in a transparent material which may be a polymer such as ethylene-vinyl acetate (EVA). The solar cells are interconnected by wiring which is run to a junction box 22.

The frame 14 defines a solar collection area 11 where the solar panel 12 is mounted and is configured to impart at least some structural rigidity to this area. The frame comprises a plurality of frame members 16, 18 in the form of elongate bars or beams. Suitable materials for frame members 16, 18 may include aluminum, aluminum alloys, steels, stainless steels, alloys, polymers, reinforced polymer composites and/or any other suitable relatively lightweight and durable substance. Materials can be further treated, such as, for example, painted, galvanized, powder coated, anodized and/or any other suitable technique for improving form and/or function of frame 10. Frame members can be provided in varying lengths depending on the desired size and shape of the module.

In the embodiment of FIG. 1, the frame 14 has a rectangular shape with two longer frame members 16 forming the long sides of the rectangle and two shorter frame 18 members forming the short sides of the rectangle. The inside portions of each frame member may be provided with a slot 13 (FIG. 2) in which the edges of the PV panel 12 are received. When the frame members are secure together, the PV panel is at least partially retained in the slot 13.

Figure 2:
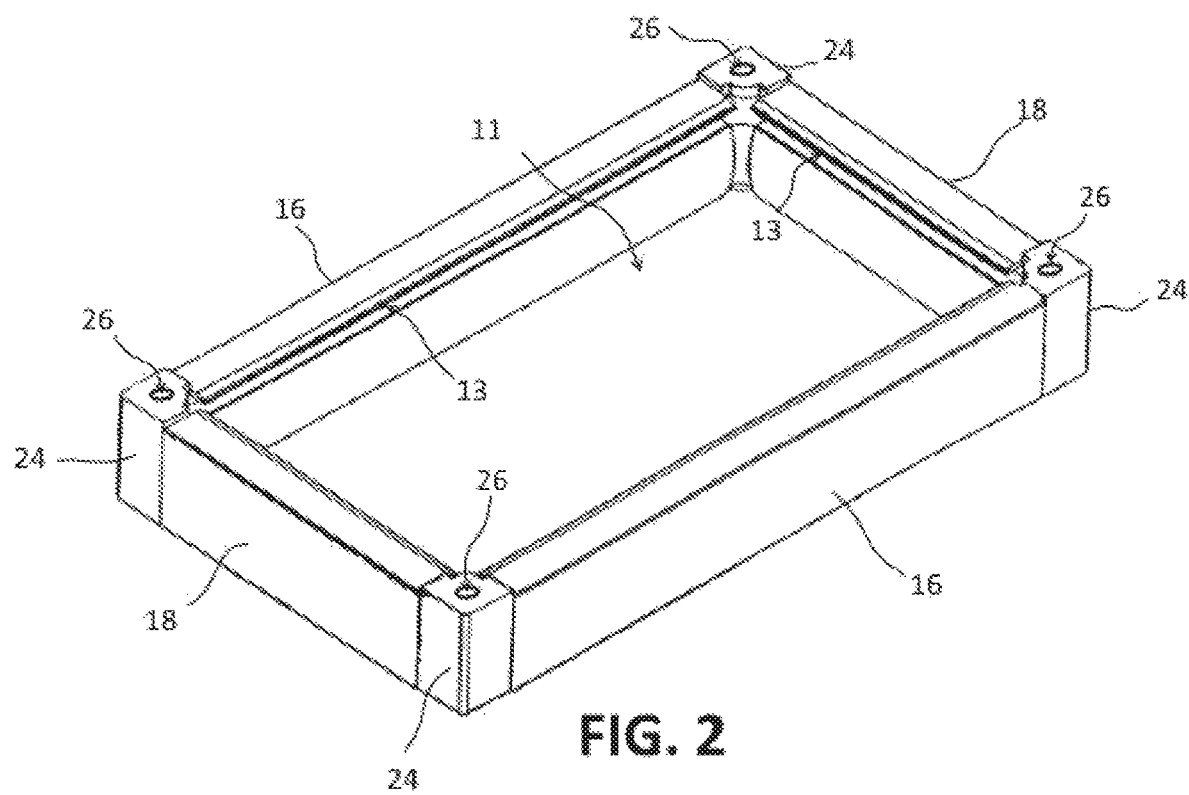
FIG. 2 is perspective view of a frame of a photovoltaic module, such as the photovoltaic module of FIG. 1.

The frame 14 includes a plurality of corners. As used herein, the term "corner", when used in connection with a PV frame, refers to the locations with regard to the PV frame 12 at which at least two frame members 16, 18 are joined or connected to each other. The number of corners depends at least partially on the number of frame members and the shape of the PV panel 12 that is to be mounted to the frame. In the embodiment of FIGS. 1 and 2, the frame 14 includes four corners.

Figure 3:
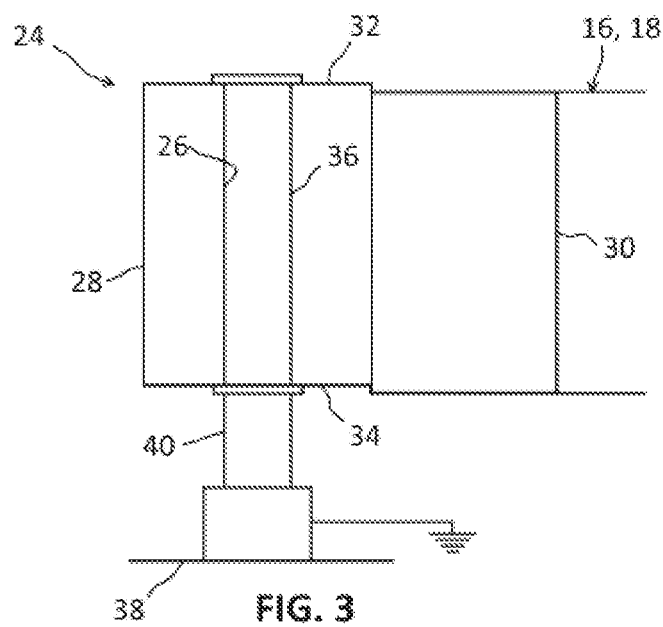
FIG. 3 is a schematic, fragmentary, cross-sectional view showing a corner member of a photovoltaic module frame with an insert component inserted into the thru-passage of the corner member.

The frame members 16, 18 are joined at each corner by a corner member 24, also referred to as a corner connector or corner key. The corner members 24 include a main body 28 and two frame attachment portions 30. The main body 28 forms the corner of the solar module 10. The frame attachment portions 30 each extend from main body 28 and are configured to be secured to an end of one of the frame members 16, 18. The frame attachment portions 30 may be attached to the frame members in any suitable manner. In one embodiment, the frame members have hollow sections at least at the ends in which the frame attachment portions 30 are received as depicted in FIG. 3. The connection between the frame attachment portions 30 and the frame members 16, 18 may be a press fit connection facilitated by an adhesive although any suitable connection method may be used, such as welding, soldering, and the like.

The main body 28 of the corner member 24 includes a top surface 32 and a bottom surface 34. In accordance with the present disclosure, the main body 28 of the corner member 24 defines a thru-passage 26 that extends through the main body 28 in a direction that is generally perpendicular to planar solar collection area defined by the frame and to the planar front and backside surfaces of the PV panel 12 when the PV panel is secured to the frame in the solar collection area. The thru-passage 26 extends through openings defined in the upper and lower surfaces 32, 34.

The passage has a substantially uniform cross-sectional shape between the upper and lower openings in the main body. However, variations in the cross-sectional shape of the passage may be used for various purposes, such as to provide, locking, positioning and/or connection features (explained in more detail below). The passage may have any suitable shape, including regular shapes, such as square, rectangular, round, polygonal, and the like, as well as irregular shapes.

The passage 26 is configured to receive insert components 36 which can be used in a number of different ways to facilitate the mounting and assembly of PV modules. Insert components 36 generally comprise a longitudinal member, such as threaded rod or bar, having a cross-sectional shape that is complementary to the cross-sectional shape of the passage 26. The insert component 36 may be formed of a strong, rigid material, such as metal and/or hard plastic which may be provided in various lengths depending on its use. The insert component may also be configured to support electrical conductors as well as electrical devices for connection to the electrical system in PV modules.

FIG. 3 depicts a simplified example of one configuration of a corner member 24 and corresponding insert component 36 for a PV module 10. In the embodiment of FIG. 3, the insert component 36 is configured to serve as an attachment/anchoring structure for the PV module. In this embodiment, the insert component 36 comprises a connecting pin or rod formed of metal, such as steel, although any suitable material may be used. The lower end of the connecting pin 36 is configured to be secured to a mounting surface 38, such as a roof of a building, a ground mount- or carport structure or a structure on a flat rood as well as a structure on floating water. The upper end of the connecting pin 36 is configured to be retained within the passage 26 in the corner member.

The connecting pin 36 may be configured to be extended through the passage 26 in the corner member 24 either from above or below and may be secured to the mounting surface 38 and to the corner member 24 in any suitable manner. In one embodiment, the connecting pin 36 is configured to be inserted into the passage 26 through the upper surface 32 as depicted in FIG. 3. The pin 36 may be configured to slide through the passage so it can be easily installed by "dropping" it into the passage. In one embodiment, the outer surface of the connecting pin 36 and the surfaces and interior walls of the corner member that define the passage may be configured to enable a locking connection between the corner member and the pin. In another embodiment, the upper end of the pin may include a widened head portion which engages the upper surface of the corner member to prevent movement of the corner member 24 and solar module in an upward direction with respect to the pin 36. A stop may be provided or installed on the pin for engaging the lower surface of the corner member 24 to prevent downward movement of the corner member 24 and PV module with respect to the pin 36.

The portion 40 of the connecting pin 36 extending between the bottom surface 34 of the corner member 24 and the attachment/fastening structure at the lower end of the connecting pin 36 may be provided in various lengths depending on the desired mounting configuration of the PV module. For example, the pin may be provided at a length that is configured to space the PV module a predetermined distance from the mounting surface in order to allow air circulation under the PV module to facilitate cooling of PV cells of the PV panel.

The connecting pin 36 may be configured to provide other functionality for the PV module. For example, in the embodiment of FIG. 3, the connecting pin 36 is additionally configured to provide a grounded connection to the PV module 10. As such, the pin 36 is formed of a conductive metal material, such as steel. The connecting pin 36 may be provided with dedicated connection structures (not shown) to facilitate electrical connections to ground and/or to the PV module. The connecting pin may be used provide ground to the frame as well as to the PV panel. To this end, the corner member may include connectors 40 (FIG. 4) and conductors 42 (FIG. 4) to facilitate a reliable electrical connection to the pin 36.

Figure 4:
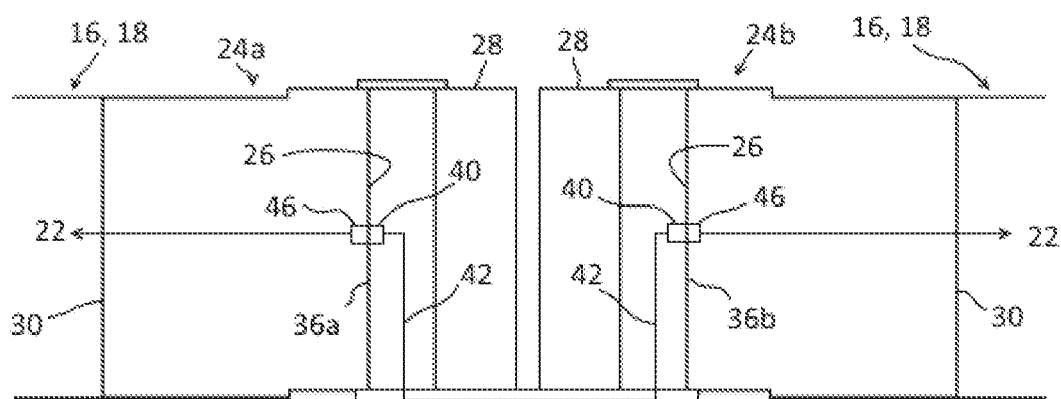
FIG. 4 is a schematic, fragmentary, cross-sectional view showing an embodiment of a corner member and insert component configuration for connecting two PV modules together side-by-side.
Figure 5:
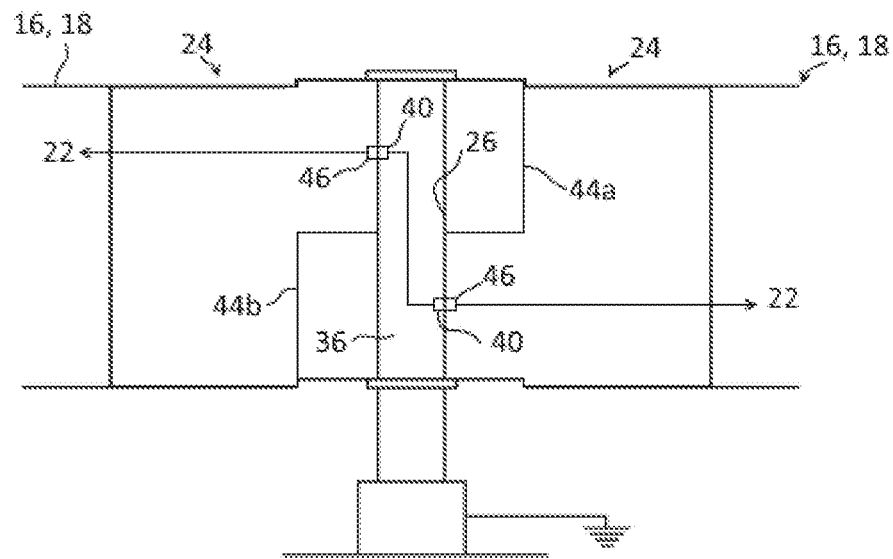
FIG. 5 is a schematic, fragmentary, cross-sectional view showing another embodiment of a corner member and insert component configuration for connecting two PV modules together side-by-side.
Figure 7:
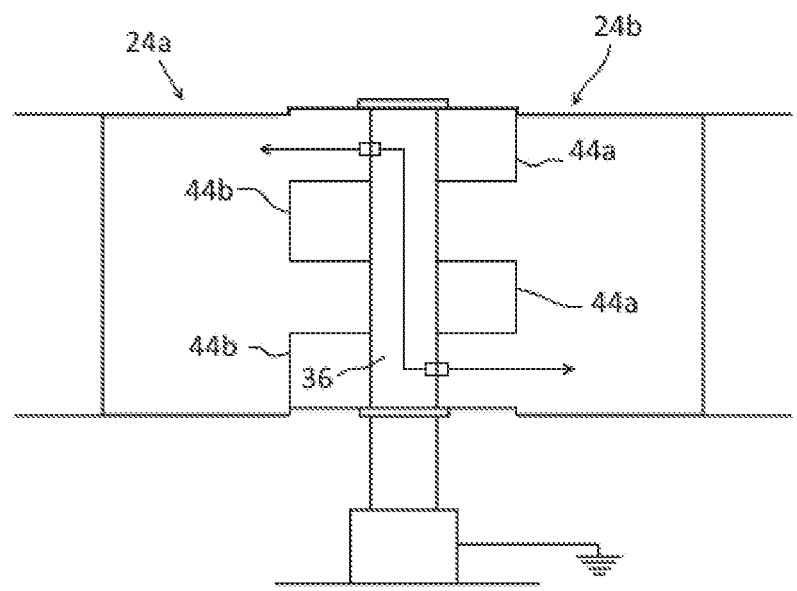
FIG. 7 is a schematic, fragmentary, cross-sectional view showing yet another embodiment of a corner member and insert component configuration for connecting two PV modules together side-by-side.

In the embodiment of FIG. 1, the insert component/pin 36 is used with a single PV module. FIGS. 4, 5 and 7 depict corner members 24 and insert components 36 that are configured to enable PV modules 10 to be attached to each other in a side-by-side, or arrayed, configuration. In one embodiment, corner members 24 from two or more adjacent PV modules 10 are positioned side-by-side, or corner-to-corner, and an insert component 36 comprising a corresponding number of pins 36 is installed in the corner members 24, as depicted in FIG. 4. In the embodiment of FIG. 4 in which two PV modules are connected, the insert component has two pins 36a, 36b.

A cross-member 37 extends between two pins 36a, 36b to secure the pins together and thereby mechanically connect the one PV module to the other PV module. The pins 36a, 36b may be installed with the cross-member 37 positioned above or below the PV modules 10. The insert component of FIG. 4 may be configured to serve as part of an attachment/anchoring structure for the PV modules as well as providing a ground connection for the PV modules, in the same manner as the insert component 36 of FIG. 3.

FIG. 5 depicts another embodiment of a corner member 24 and insert component 36 combination that may be used to secure PV modules together in a side-by-side, or arrayed, configuration. In the embodiment of FIG. 5, the corner members 24a, 24b are configured so that the thru-passages 36 of the corner members can be aligned to form a continuous passage through both corner members 24a, 24b. As can be seen in FIG. 5, the aligned passages 36 enable a single connection pin 36 to be extended through both corner members to secure the PV modules 10 together. In this embodiment, the corner members 24a, 24b are provided with lateral extensions 44a, 44b through which the passages 36 are defined. The lateral extensions allow the passages to be offset from the frame body so as to provide clearance for the connection pin.

The use of a single connection pin 36 may require that two different corner member configurations be utilized. For example, in FIG. 5, the first corner member 24a includes a lateral extension 44a in an upper position with respect to the main body 28, and the second corner member 24b includes a lateral extension 24b in a lower position with respect to the main body 28. The upper and lower positioning of the adjacent lateral extensions 44a, 44b enables the lateral extensions to overlap each other while permitting the corner members 24a, 24b to remain substantially aligned with each other. In another embodiment, the corner members 24a, 24b may be configured to have multiple lateral extensions that are configured to be interleaved to form a hinge-like configuration as depicted in FIG. 7. The connecting pin used in the embodiment of FIGS. 5 and 7, as well as any other embodiment described herein, may be extended to secure the PV modules to a mounting surface 38, such as a roof, as well as being configured to provide a ground connection to the PV modules.

The insert components of the present disclosure may be configured to provide electrical connections to the PV modules in addition to, or as an alternative to, the mechanical connections described above. As depicted in FIGS. 4-7, insert components 36 may be provided with electrical connectors 40 which are configured to establish electrical connections with complementarily configured connectors 46 provided in the corner member 24 when the insert component 36 is installed in the passage 26 of the corner member 24. The electrical connectors 46 in the corner member 24 in turn are connected to the wiring of the PV panel 12, e.g., via junction box 22 (FIG. 1) or directly to the panel 12. The insert components 36 can therefore be used to establish electrical connections between PV modules, as depicted in FIGS. 4, 5 and 7, and between a PV module and an external electrical system (FIG. 6) by installing appropriately configured insert components 36 into the corner members 24.

Figure 6:
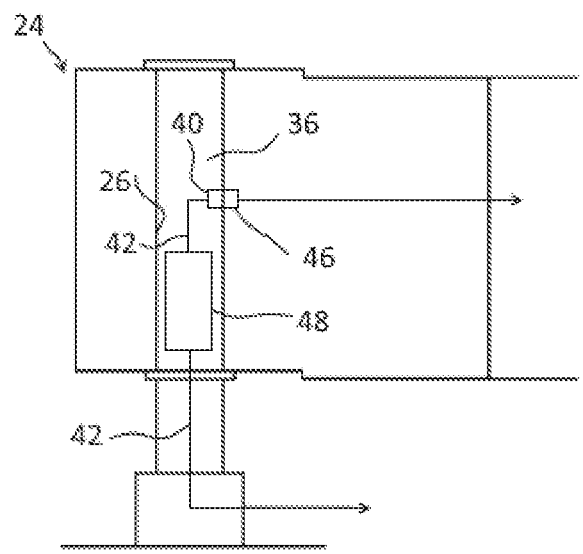
FIG. 6 is a schematic, fragmentary, cross-sectional view showing an insert component includes an electronic device.

As depicted in FIG. 6, insert components 36 may also include electronic devices 48 which may be electrically connected to the PV module 10 via the electrical connectors 40, 46 of the insert component and corner member 24. The electronic device 48 may comprise a microinverter for converting the direct current (DC) output of the solar module into an alternating current (AC) which enables the power generated by the PV module to be fed into the electrical grid. The electronic device 48 may also comprise an energy storage device which can be used to store the energy output by the PV module. The electronic device 48 might further comprise a remote disconnect for rapid shutdown of the equipment in case of an emergency. Of course, different types of electrical connections and electronic devices may be utilized in the insert component and corner members as needed depending on the application.

Figure 8:
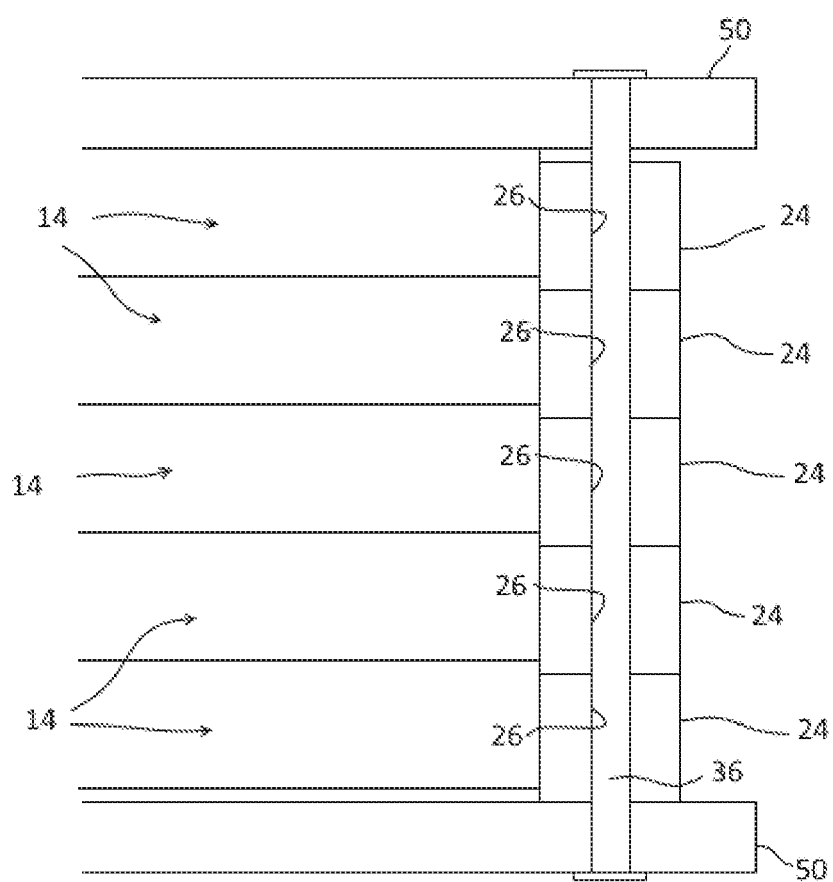
FIG. 8 is a schematic depiction of corner members being used to facilitate stacking a plurality of photovoltaic modules.

PV frames 14 having corner members 24 with thru-passages as described herein also enable a plurality of PV modules to be easily arranged and secured in a stacked configuration. As depicted in FIG. 8, a plurality of PV modules 14 having the same configuration can be stacked one on top of the other. At least one corner member of each PV module (which is located in the same position on each module) includes a thru-passage 26 as described above. Any number from one to all of the corners may be provided with corner members 24 having thru-passages 26. When the PV modules 14 are stacked, the passages 36 in the corner members 24 align to form a continuous passage that extends through all of the stacked corner members 24 as depicted in FIG. 8.

A long connecting rod 36 may then be extended through the continuous passage 26 to secure the PV modules 14 in the stacked configuration. When in the stacked configuration, the plurality of PV modules 14 can be easily stored and transported as a unit while occupying a minimal amount of space. The connecting rod 36 can be secured to protective panels/pads 50 positioned at one or both ends of the stack if desired (although not necessarily) or to a pallet to facilitate transport. A PV module stack can be easily transported to an installation site and unstacked by simply removing the connecting rod(s). The connecting rod(s) 36 can then be used as a grounding rod for the PV module installation. Depending on the ground conditions it is possible to interconnect a plurality of grounding rods to form a longer rod to enable grounding.

The corner members 24 may be configured to facilitate alignment of the PV modules when in the stacked configuration so that the passages in the corner members are also aligned. To this end, the corner members 24 may be provided with upper and lower surfaces 32, 34 that are provided with complementary contours, offsets, and the like, as depicted in FIG. 8. The upper and lower surfaces 32, 34 can be used to guide and position the corner members 24 when stacked on top of each other to ensure a proper alignment of the thru-passages 26.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A photovoltaic (PV) module, comprising:
a solar panel;
a plurality of frame members, each frame member including a hollow section; and
a plurality of corner keys, each corner key mechanically connecting plural frame members of the plurality of frame members to one another to form a frame around the solar panel, wherein
each corner key mechanically connects to a frame member at the hollow section of the frame member,
each corner key includes a through-hole that extends through the corner key from a planar front surface of the PV module to a planar back surface of the PV module via respective upper and lower surfaces of the corner key along an axis that is generally perpendicular to the planar front surface of the PV module, wherein the through-hole and the solar panel are laterally separated in a plane parallel to the front surface of the PV module, and each corner key
includes an electrical connector positioned within the through-hole, the electrical connector electrically connects the PV module via wiring of the PV module through a sidewall of Pill the through-hole to an external electrical system.

2. The PV module according to claim 1, wherein
each corner key comprises a plurality of frame attachment portions, and
each frame attachment portion is configured to insert into a hollow section of one of the frame members by a press fit connection.

3. The PV module according to claim 1, wherein each corner key mechanically connects to a frame member with an adhesive.

4. The PV module according to claim 1, wherein the upper and lower surfaces of each corner key include complementary contours to facilitate alignment of the PV module with another PV module when in a stacked configuration.

5. The PV module according to claim 1, wherein a first corner key of the plurality of corner keys includes an electronic device electrically connected to the wiring via the electrical connector of the first corner key.

6. The PV module according to claim 5, wherein the first corner key includes an inverter that converts direct current output from the solar panel into alternating current.

7. The PV module according to claim 5, further comprising:
an energy storage device that stores energy output by the PV module.

8. The PV module according to claim 5, further comprising:
a remote disconnect that, in case of an emergency, initiates a rapid shutdown of the PV module.

9. The PV module according to claim 1, wherein a corner key, of the plurality of corner keys, is configured to output via the electrical connector energy collected by the solar panel to an external electrical grid.

10. The PV module according to claim 1, wherein a corner key, of the plurality of corner keys, is configured to output via the electrical connector energy collected by the solar panel to the external electrical system.

11. An array of photovoltaic (PV) modules, the array comprising:
a plurality of PV modules, each PV module including:
a solar panel;
a plurality of frame members, each frame member including a hollow section; and
a plurality of corner keys, each corner key mechanically connecting plural frame members of the plurality of frame members to one another to form a frame around the solar panel, wherein
each corner key mechanically connects to a frame member at the hollow section of the frame member of the PV module,
each corner key includes a through-hole that extends through the corner key from a planar front surface of the corresponding PV module to a planar back surface of the PV module via respective upper and lower surfaces of the corner key along an axis that is generally perpendicular to the planar front surface of the PV module, wherein the through-hole and the solar panel are laterally separated in a plane parallel to the front surface of the PV module, and each corner key includes an electrical connector positioned within the through-hole of the PV module, the electrical connector electrically connects the PV module via wiring of the PV module through a sidewall of the through-hole to an external electrical system.

12. The array of PV modules according to claim 11, wherein for each PV module, a corner key of the plurality of corner keys is configured to mechanically connect to at least one frame member of another PV module in the array of PV modules.

13. The array of PV modules according to claim 11, wherein for each PV module:
the PV module is arranged in an arrayed configuration of the array of PV modules, and
a first corner key is secured to a second corner key of an adjacent PV module to mechanically connect the PV module to the adjacent PV module.

14. The array of PV modules according to claim 13, wherein for each PV module:
the first corner key includes a first lateral extension,
the second corner key includes a second lateral extension,
the first lateral extension overlaps the second lateral extension to align the first corner key and the second corner key such that the first corner key and the second corner key share a continuous through-hole, and
an attachment member is extended through the continuous through-hole to secure the first corner key to the second corner key to mechanically connect the PV module to the adjacent PV module.

15. The array of PV modules according to claim 11, wherein for each PV module, a first corner key of the plurality of corner keys includes an electronic device electrically connected to the wiring via the electrical connector of the first corner key.

16. A corner key for a photovoltaic (PV) module that includes a solar panel and a plurality of frame members, the corner key comprising:
a first connecting member for mechanically connecting to a first frame member of the plurality of frame members via, a first hollow section of the first frame member;
a second connecting member for mechanically connecting to a second frame member of the plurality of frame members via a second hollow section of the second frame member;
a through-hole that extends through the corner key from a planar front surface of the PV module to a planar back surface of the PV module via respective upper and lower surfaces of the corner key along an axis that is generally perpendicular to the planar front surface of the PV module;
an electrical connector positioned within the through-hole, the electrical connector electrically connecting the PV module via wiring of the PV module through a sidewall of the through-hole to an external electrical system, and an insert component comprising the electrical connector, the insert component having a cross-sectional shape of the through-hole.

17. The corner key according to claim 16, wherein the first connecting member is configured to mechanically connect to at least one frame member of another PV module in an array of PV modules.

18. The corner key according to claim 16, wherein the corner key comprises upper and lower surfaces with complementary contours to facilitate alignment of the PV module with another PV module when in a stacked configuration.

19. The corner key according to claim 16, further comprising:
an electronic device electrically connected to the wiring via the electrical connector.

20. The corner key according to claim 19, further comprising:
an inverter for converting direct current output from the solar panel into alternating current.

* * * * *